(12) United States Patent
Agari et al.

(10) Patent No.: US 7,465,095 B2
(45) Date of Patent: Dec. 16, 2008

(54) LINEAR MOTION GUIDE UNIT

(75) Inventors: Norimasa Agari, Mino (JP); Toyohisa Ishihara, Mino (JP); Kazue Furuta, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 304 days.

(21) Appl. No.: 11/354,988

(22) Filed: Feb. 16, 2006

(65) Prior Publication Data

US 2006/0215943 A1    Sep. 28, 2006

(30) Foreign Application Priority Data

Mar. 23, 2005    (JP) .............. 2005-083571

(51) Int. Cl.
    *F16C 29/06*    (2006.01)
(52) U.S. Cl. .......................... 384/45; 384/13
(58) Field of Classification Search ............. 384/43–45, 384/13
    See application file for complete search history.

(56) References Cited

U.S. PATENT DOCUMENTS 6,125,968 A * 10/2000 Shirai .......................... 384/13
6,250,804 B1 * 6/2001 Hsu et al. ...................... 384/13
2003/0164264 A1 9/2003 Luo
2005/0041896 A1 * 2/2005 Itabashi et al. ................. 384/45
2005/0201644 A1 * 9/2005 Lee et al. ...................... 384/13

FOREIGN PATENT DOCUMENTS

| JP | 9-303392 | 11/1997 |
| JP | 3066116 | 11/1999 |
| JP | 2001-82469 A | 3/2001 |

* cited by examiner

*Primary Examiner*—Thomas R Hannon
(74) *Attorney, Agent, or Firm*—Browdy and Neimark, P.L.L.C.

(57) ABSTRACT

A linear motion guide unit with a lubricating system made compact or slim in construction with inexpensive production cost and permitted to lubricate sliding contacts with accompanying reduced maintenance. The slider has a tubular member for a return passage to allow rolling elements rolling through there, a lubricant reservoir to accumulate lubricant, and a leading member to transfer the lubricant from the reservoir to the tubular member. The lubricant is supplied from the reservoir into the return passage via the leading member. The lubricant reservoir including an occluding member packed in a cartridge to keep the lubricant inside the cartridge.

7 Claims, 5 Drawing Sheets

(A)

(B)

(A)

(B)

LINEAR MOTION GUIDE UNIT

FIELD OF THE INVENTION

The present invention relates to a linear motion guide unit comprised of an elongated guide rail, and a slider that is allowed to move on the elongated guide rail relatively to the guide rail by virtue of more than one rolling element.

BACKGROUND OF THE INVENTION

The recently remarkable development in extensively various machines including semiconductor fabricating equipment and so on has needed linear motion guide units that are expected to get any parts moving in a reciprocating manner with precise position control and smooth movement, despite being made reduced in construction. Meanwhile, modern linear motion guide units have been especially required to meet with the maintenance-free operation regarding lubrication for rolling elements from many aspects of conserving energy as well as keeping running cost and maintenance cost of equipment reasonable. A diversity of machines including semiconductor fabricating equipment, assembly machines, inspection instruments and so on, nevertheless, is looking to the linear motion guide unit that could ensure the maintenance-free operation more securely than even when used under high-speed, high-cyclic operating condition.

In the commonly assigned Japanese Patent Laid-Open No. 2001-82469, there is disclosed a linear motion guide unit in which a return passage in a slider is made of sintered resinous member of cellular or porous structure that is impregnated with lubricant to ensure lubrication for the rolling elements over a long-lasting operation, improving the duration of maintenance-free condition.

The prior linear motion guide unit constructed as stated earlier is comprised of an elongated guide rail and a slider movable lengthwise relative to the guide rail by virtue of more than one rolling element that is allowed rolling into the load-carrying race from the non-loaded return passage cut in the slider, and vice versa in a circulating manner. The return passage is constituted with a sleeve of sintered resinous member having cellular structure, which fits into a fore-and-aft hole made in the slider so as to allow the rolling elements running inside the sleeve. Lubricant soaked into the cellular texture of the sintered resinous member is reserved or held in the cells or pores in the cellular structure. Oily ingredient of the lubricant is constantly applied on the rolling elements for long-lasting operation while they roll through inside the sleeve, and oil films around any rolling elements get lubricating smoothly the load-carrying surfaces as the rolling elements run through load race, with accompanying reduced frictional resistance against the slider, thereby improving the durability of the linear motion guide unit.

However, it still remains a further challenge to the prior linear motion guide unit as recited earlier to continue supplying any additional lubricant to the rolling elements.

A linear guideway with self-lubrication system is moreover disclosed in Japanese Utility Model Registration No. 3066116, in which the rolling elements are directly lubricated with grease while they roll through the non-loaded return passage. The prior guideway as stated earlier is expected to conserve grease as well as keep the environment against pollution caused by massive leakage of grease. Besides, grease after run out would be replenished without disassembly of the self-lubrication system. The prior linear guideway with self-lubrication system includes an oil reservoir to store grease inside the slider, a grease path to lead grease out of the oil reservoir into the non-loaded return passage, a sealing pad to keep grease against leakage, and a fibrous textile packed in the oil reservoir to ooze slowly the non-loaded return passage with grease on the principle of siphonage. The linear guideway receives further lubrication with any lubricator when its grease runs out.

With the linear guideway with self-lubrication system reserving only as much lubricant as once needed, nevertheless, the reserved quantity of lubricant might be not necessarily enough to ensure the maintenance-free operation, while how quantity of lubricant is replenished gets unknown easily. Moreover, the lubricant applicators are much tough to select and use them.

Another linear guideway is disclosed in US2003/0164264A1, in which a lubricating structure sits transversely inside a slider and mainly contains an oil reservoir inside the slider. The oil reservoir extends along both sides of the slider to communicate with slide way. A diversion device of fibrous material such as felt and the like is installed in the oil reservoir. A sealing member is installed correspondingly to the oil reservoir on one end of the slider. The diversion device at one end thereof reaches a guideway cut in the slider.

The prior linear guideway with the lubricating structure as stated earlier is highly tough to work it because a groove to fit over the diversion device has to be cut in the slider.

A further another linear motion guide unit with lubricating means is disclosed in Japanese Patent Laid-Open No. H09-303392, in which a lubricating member made of rubber or synthetic resin containing lubricant is built in a slider to make automatic application of lubricant to the rolling elements inside the slider with no necessity of replenishing lubricant from the outside of the slider. The slider is made therein with a lubrication port where the lubricating member is installed and biased inwards by resilient force to get the lubricant oozing out of the lubricating member to reach a circulating passage where the rolling elements roll through there.

With the prior linear motion guide unit with lubricating means constructed as stated earlier, constant application with certainty of lubricant to the return passage couldn't be expected because the quantity of lubricant oozy out of the lubricating member depends on the temperature rise or the biasing force exerted by the resilient plug. The linear motion guide unit of the type recited in the last-mentioned prior art, moreover, would be unsuitable for steady application of lubricant to every location to be lubricated because the lubricant is left to flow in gravitational direction.

There, advanced technology has come to hope any linear motion guide unit that can be expected to increase the volumetric quantity of lubricant prepared for the application to the return passage, making certain of maintenance-free operation for the long-last service life and also make the replenishment of lubricant easier by employment of a replaceable cartridge system.

SUMMARY OF THE INVENTION

In view of the above shortcomings related with the prior linear motion guide unit in which a slider is made therein with only a return passage composed of a tubular member of cellular structure impregnated with lubricant, the present invention derived from many repeated empirical results has as its principal object the provision of a linear motion guide unit in which a slider is made therein with a lubricant reservoir to apply lubricant for long-lasting period of time, and a leading member to constantly supply the lubricant from the lubricant reservoir to a tubular member inside a return passage. Moreover, the present invention provides a linear motion guide unit in which the lubricant reservoir is made replaceable to make it easier to handle it, and also made compact in construction as well as inexpensive in production cost to achieve steady maintenance-free operation.

The present invention is concerned with a linear motion guide unit comprising a guide rail having a first lengthwise raceway groove thereon, and a slider made therein with a second raceway groove in opposition to the first raceway groove, the slider being allowed to move lengthwise of the guide rail by virtue of more than one rolling element, wherein the slider includes a tubular member to provide a return passage to allow the rolling element rolling through the return passage, the tubular member being made to have a cellular structure adapted to be impregnated with lubricant, a lubricant reservoir to harbor the lubricant, which is sequentially applied to the tubular member, and a leading member to allow the lubricant directing from the lubricant reservoir towards the tubular member, and wherein the lubricant reservoir has a cartridge of cellular structure to allow the lubricant remaining therein and oozing through the cartridge.

In one aspect of the present invention, there is provided a linear motion guide unit in which the cartridge of the lubricant reservoir is made of a sintered resin shaped in a tubular construction.

In another aspect of the present invention, there is provided a linear motion guide unit that the cartridge of the lubricant reservoir stows therein an occluding member made of heat-fused staple compact in which staples are partially heat-joined together to form the cellular structure to keep the lubricant against lopsided inside the cartridge.

In another aspect of the present invention, there is provided a linear motion guide unit in which the leading member is made of the staple compact of synthetic resin long-fibers and/or a sintered resin of cellular structure and arranged so as to come into engagement with both an outside surface of the cartridge and an outside surface of the tubular member.

In a further another aspect of the present invention there is provided a linear motion guide unit in which the slider has a carriage made therein with holes to fit over the tubular member, lubricant reservoir and leading member, one to each member, the leading member being made up of a first leading part and a second leading part, the hole to fit over the leading member being made up of a first hole section to receive therein the first leading part and a second hole intersecting with the first hole section to receive therein the second leading part, and the first and second leading parts comes into engagement with one another.

In another aspect of the present invention, there is provided a linear motion guide unit in which the first leading part comes into abutment at any one end thereof against the cartridge of the lubricant reservoir while at another end thereof against the second leading part, and wherein the first leading part is laid to extend between the lubricant reservoir and the second leading part.

In another aspect of the present invention, there is provided a linear motion guide unit in which the first leading part fits into the first hole section while the second leading part fits into the second hole section, and wherein first and second hole sections are both closed with sealing plugs at their ends opened to atmosphere. In a further another aspect of the present invention, there is disclosed a linear motion guide unit in which the first hole section is made in the carriage to extend in widthwise direction of the carriage while the second hole section is made to extend from a top surface of the carriage to the hole into which the tubular member fits to provide the return passage.

With the linear motion guide unit constructed as stated earlier, the return passage made in the slider is constituted with the tubular member made to have the cellular structure adapted to be impregnated with lubricant. The lubricant reservoir installed in the slider is to increase the amount of lubricant supplied to the tubular member. The leading member inside the slider makes sure of applying or leading gently the lubricant from the lubricant reservoir towards the tubular member without causing any seepage or leakage. Moreover, the lubricant reservoir is made replaceable with new one and easier to handle it with less care. The lubricant reservoir and the leading member made simple in construction are also contribute to the provision of the slider that is less in production cost, compact in construction, and easier to shrink it in construction. The linear motion guide unit with the constructional features as stated earlier is allowed to work over an extended range more than three times in maintenance-free operation as compared with the conventional one having just the lubricant-impregnated tubular member.

The linear motion guide unit constructed according to the present invention makes it possible to provide the slider which can harbor ample quantity of lubricant enough to make certain of reduced maintenance for lubrication. The linear motion guide unit of the present invention can work over an extended range, for example more than three times in maintenance-free operation as compared with the conventional one having just the lubricant-impregnated tubular member.

With the linear motion guide unit of the present invention, moreover, the lubricant reservoir has the cartridge or shell of cellular structure to allow the leading member to bring out the lubricant from anywhere around the cartridge. This means that the leading member is permitted to have a simple, for example a circular contour, and also make connection with the lubricant reservoir anywhere with no adverse influence on stiffness or mechanical strength of the slider. Thus, the cartridge of cellular structure is also contribute to the provision of the slider that is high in functional effect, even with less in production cost and compact in construction. Further, the cartridge of the lubricant reservoir, since made exchangeable for another one, is easier in handling. The lubricant reservoir and the leading member are all made simple in construction. The lubricant reservoir holds therein the occluding member that is able to accumulate ample lubricant without causing any leakage or seepage. The leading member serves to take the lubricant oozing out of the cartridge and transfer gently the lubricant to the tubular member with no leakage or loss to lubricate the rolling elements.

DETAILED DESCRIPTION OF THE PREFERRED EMBODIMENTS

Figure 1:
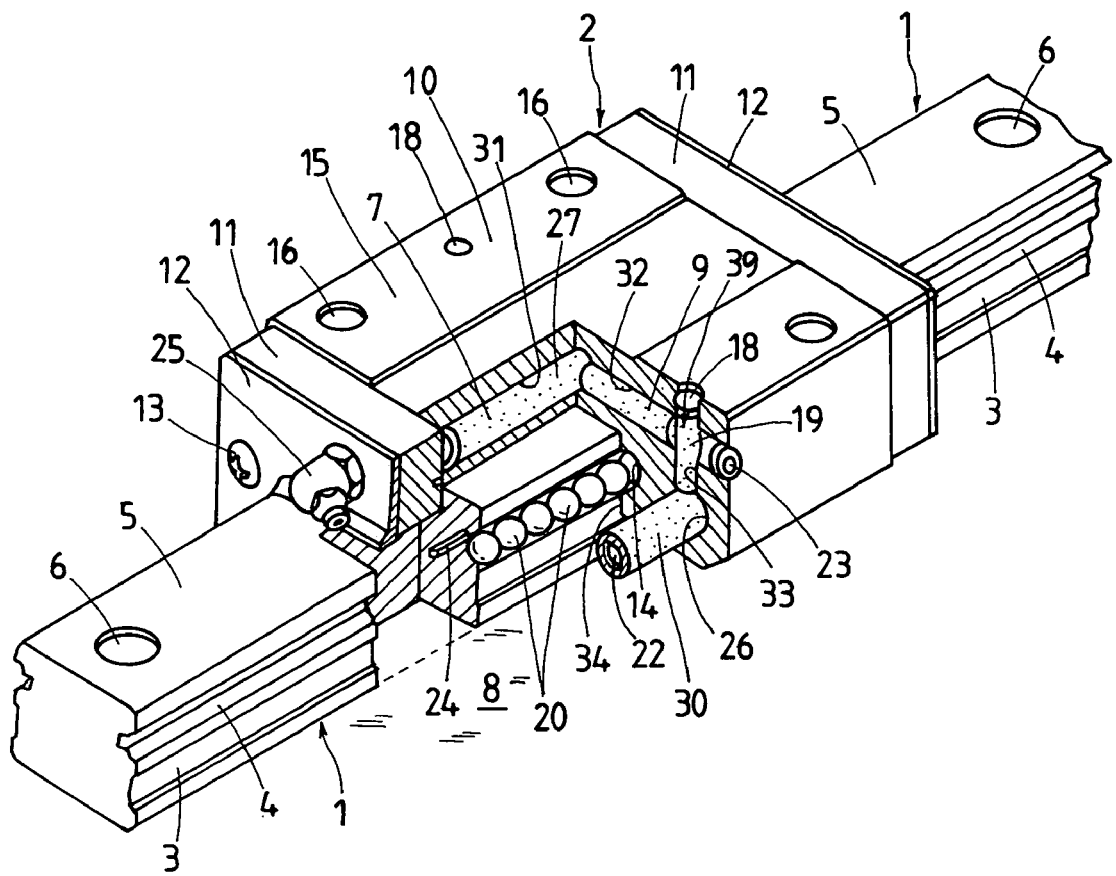
FIG. 1 is a partially cutaway view in perspective illustrating a preferred embodiment of a linear motion guide unit according to the present invention.
Figure 2:
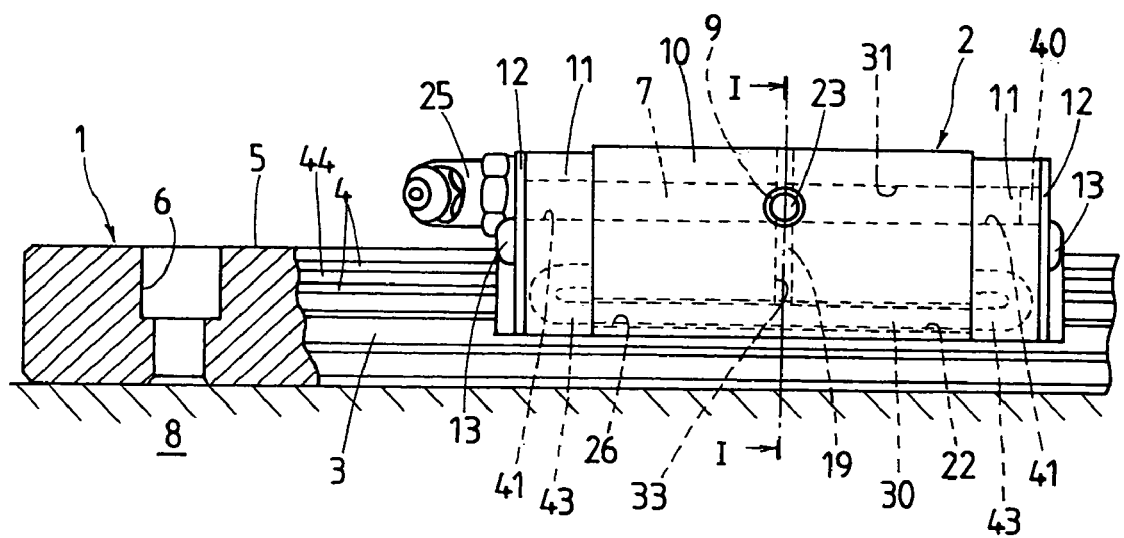
FIG. 2 is a partially cutaway view in front elevation of the linear motion guide unit of FIG. 1.
Figure 3:
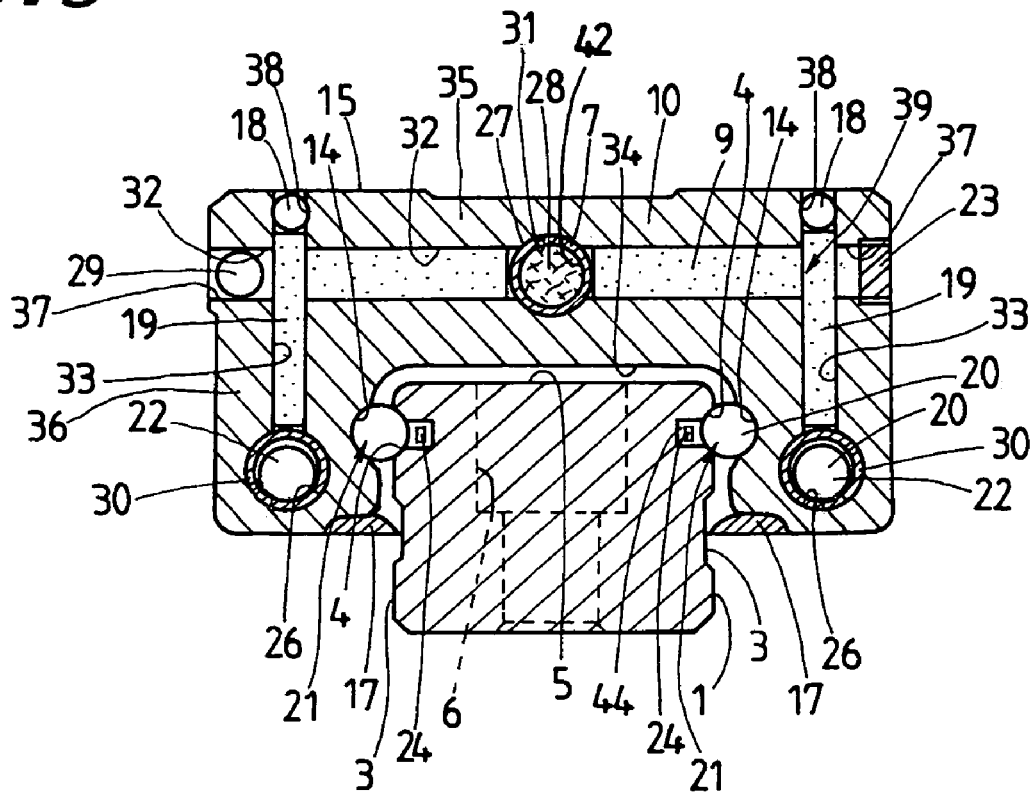
FIG. 3 is a view in transverse section along a plane I-I of FIG. 2 showing the linear motion guide unit.
Figure 4:
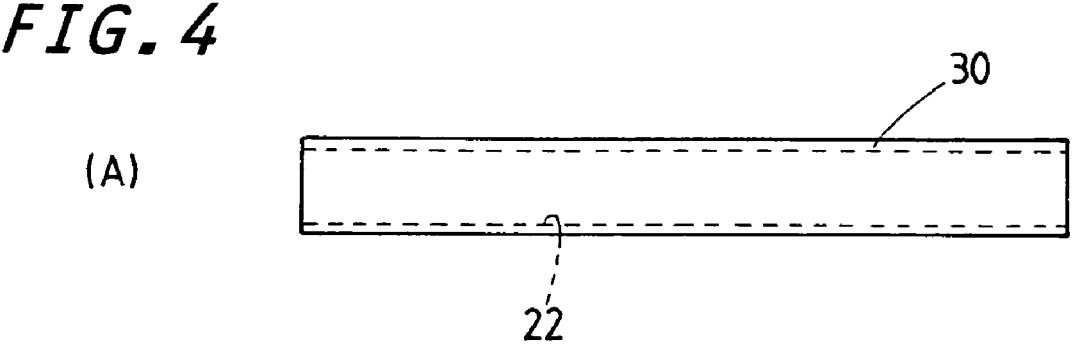
FIG. 4 shows a tubular member to fit into a carriage in the linear motion guide unit of FIG. 1. In the illustration labeled (A) the tubular member is shown in front elevation while the illustration labeled (B) is a view in left-sided elevation of the tubular member.
Figure 4:

The linear motion guide unit according to the present invention is well adapted for use in any relatively sliding components in machinery as diverse as semiconductor fabricating equipment, assembly machines, inspection instruments, medical instruments, measurement/inspection instruments, and so on. The linear motion guide unit of the present invention is expected to get any parts moving in a reciprocating manner with precise position control and smooth movement, despite being made much less in construction, and further ensure positive maintenance-free operation regarding lubrication for rolling elements even when used in the various machines as recited above under high-speed, high-cyclic operating condition.

A preferred embodiment of a linear motion guide unit according to the present invention will be explained hereinafter in detail with reference to the accompanying drawings. The linear motion guide unit of the present invention may be equally adapted for any type of rolling elements, whether balls 20 or rollers. More particular, the linear motion guide unit developed according to the present invention is made substantially equivalent in construction with the prior linear motion guide unit disclosed in the commonly assigned Japanese Patent Laid-Open No. 2001-82469, except that the lubricant supply system has therein a lubricant reservoir 7.

The linear motion guide unit of the present invention is in general composed of an elongated guide rail 1 made on both lengthwise sides 3 thereof with first raceway grooves 4, one to each side, and a slider 2 that fits over or conforms to the guide rail 1 in a way to move relatively to the guide rail 1 by virtue of more than one rolling element of a ball 20. On the slider 2, there are made second raceway grooves 14 in opposition to the first raceway grooves 4. More than one rolling element of a ball 20 is allowed to roll through a load-carrying race 21 defined between the first and second raceway grooves 4 and 14. The guide rail 1 is made with some holes 6 that are used to fasten the guide rail 1 to any stationary bed 8 including a machine bed, mounting base, workbench, other counterpart, and so on. The slider 2 is composed of the carriage 10 made thereon with the raceway grooves 14 and therein with return passages 22, end caps 11 arranged on forward and aft ends of the carriage 10, one to each end, and formed therein with turnaround passages, not shown, and end seals 12 attached to outward end surfaces of the end caps 11. A lower seal 17 is disposed to extend over the underneath of the slider 2. The end caps 11 and end seals 12 are both secured to the carriage 10 with using fastening bolts 13. The carriage 10 of the slider 2 is made on the top surface 15 thereof with threaded holes 16 that are used to install any object including various instruments, works, and so on thereto. Any one of the end caps 11 is provided with a lubricant path, not shown, to feed lubricant from a grease nipple 25 into both the turnaround passage 43 and a lubricant reservoir 7 inside the carriage 10. A retainer band 24 fits into a fore-and-aft trench 44 cut deep in the raceway groove 4 on the guide rail 1 to retain the balls 20 to thereby prevent the balls 20 from falling out of the linear motion guide unit. The slider 2 is constructed to provide a circulating circuit to allow the balls 20 running through there. The circulating circuit includes the load-carrying race 21, forward and aft turnaround passages 43 connected at their one ends thereof with forward and aft ends of the load-carrying race 21, and the return passage 22 connected with other ends of the turnaround passages 43. Thus, the balls 20 in the slider 2 run through the load area of the load-carrying race 43 to a non-loaded area inclusive of the return passage 22 and forward and aft turnaround passages 43 in a circulating manner as the slider 2 moves relatively to the guide rail 1.

The return passage 22 is constituted with a tubular member 30 of cellular structure that is expected to soak up lubricant. The carriage 10 in the slider 2 is made with a fore-and-aft hole 26 to accommodate the tubular member 30 therein. The carriage 10 is made up of a ceiling portion 35 facing on an upper surface 5 of the guide rail 1 and widthwise opposing side portions 36 extending downwards along the sidewise edges of the ceiling portion 35 to define an inverted U-shape recess 34 together with the ceiling portion 35 when viewed in transverse section. The second raceway grooves 14 are made on inward surfaces of the widthwise opposing side portions 36 while the fore-and-aft holes 26 are bored through the widthwise opposing side portions 36 in a way extending in parallel with the second raceway grooves 14 to receive therein the tubular members 30 to define the return passages 22.

The linear motion guide unit of the present invention especially features the provision of lubricant application system to supply the tubular members 30 with lubricant. The constructional feature of the present invention resides in that the lubricant application system in the carriage 10 is, in combination, comprised of the lubricant reservoir 7 and a leading member 39 to transfer lubricant towards the return passages 22. With the constructional feature as recited earlier, the lubricant applied to the rolling elements is increased in quantity compared with the prior lubrication system, and further the lubricant application system itself is made easier to handle as well as improving in reliability for lubrication security. The lubricant reservoir 7 is made of a cartridge 27 that accommodates therein lubricant to be fed into the tubular member 30 and fits into a fore-and-aft hole 31 made in the ceiling portion 35 of the carriage 10 in a way lying along a widthwise midway zone of the ceiling portion 35. The leading member 39 to transfer lubricant from the lubricant reservoir 7 to the tubular member 30 is so arranged as to come into engagement with the lubricant reservoir 7 at any one of the opposite ends thereof while the tubular member 30 at another end.

With the version stated here, the leading member 39 is made up of a first leading part 9 and a second leading part 19 and is placed in the carriage 10 at a roughly midway between forward and aft ends of the carriage 10. The first leading part 9 fits into a horizontal hole 32 made in the ceiling portion 35 in a widthwise direction of the carriage 10 in a way intersecting with the fore-and-aft hole 31 made in the ceiling portion 35 of the carriage 10. The second leading part 19 fits into a downward hole 33 made in the associated side portion 36 in a direction intersecting with both the horizontal hole 32 for the first leading part 9 and the fore-and-aft hole 26 to accommodate the tubular member 30.

The first leading part 9 extends between the second leading part 19 and the lubricant reservoir 7, which has the cartridge 27 to accommodate lubricant therein. The cartridge 27 is made of cellular or porous structure capable of soaking up lubricant. The first leading part 9 is securely held between the lubricant reservoir 7 and the second leading part 19 by virtue of a resilient force inherent in the carriage 27.

In detail, the first leading part 9 comes into abutment at any one of the opposite ends thereof against an outside surface around the cartridge 27 of the lubricant reservoir 7 while at another end thereof against an outside surface around the second leading part 19. The second leading part 19 comes into abutment at any one of the opposite ends thereof against the tubular member 30 while the first leading part 9 is arranged in a way held between the second leading part 19 and the lubricant reservoir 7. The fore-and-aft hole 31 to fit over the lubricant reservoir 7 and the holes 32, 33 to receive the leading member 39 are all made circular in cross section. Both the holes 32 and 33 to receive the first and second leading parts 9 and 19 respectively are closed at their ends opened to the atmosphere. That is to say, the horizontal hole 32 to fit over the first leading part 9 is closed at the opposite open ends 37 thereof with using a check ball 29 and a sealing plug 23. The downward hole 33 to fit over the second leading part 19 is opened at 38 in the ceiling portion 35 of the carriage 10. The upward opening 38 is closed with a check ball 18.

The lubricant reservoir 7 can be taken apart through a mouth 41 that is left opening after either the grease nipple 25 has been removed out of any one end of the forward and aft ends of the slider 2 or a sealing plug 40 has been released from another end of the slider 2. Upon replacing any existing lubricant reservoir 7 with new one or loading the slider 2 with new lubricant reservoir 7, the new lubricant reservoir 7 is forced into through any one of forward and aft openings 41 remained after both the grease nipple 25 and the sealing plug 40 have been dismantled out of the slider 2, so that the spent lubricant reservoir 7 existing in the fore-and-aft hole 31 in the slider 2 is pushed ahead towards another mouth 41 to be expelled from the slider 2. It will be thus understood that the lubricant reservoir 7 is constructed in the form of exchangeable cassette, which is allowed to fit easily into the fore-and-aft hole 31 in the slider 2.

The tubular member 30 is made of a sleeve constructed by the sintering of powders of ultrahigh molecular weight polyethylene. The resulting sintered resinous compact has many continuous open cells left among particles pressed and sintered. Thus, the compacts readily soak up lubricant. The tubular member 30 has an inside hole for the provision of the return passage 22, which is somewhat larger in diameter than the ball 10. The tubular member 30 has an outside surface circular in transverse section, which has an outside diameter to allow the tubular member 30 to loose fit into the fore-and-aft hole 26 in the carriage 10 with leaving a clearance between them. With the version disclosed here, the tubular member 30 has the inside hole made circular in cross section in conformity with the rolling element of ball 20. As an alternative, the tubular member 30 may be made in compliance with the contour of the rolling element including a roller and so on. In any event, the tubular member 30 is made rich in stiffness and capable of soaking up, retaining and getting oozing lubricant.

Figure 5:
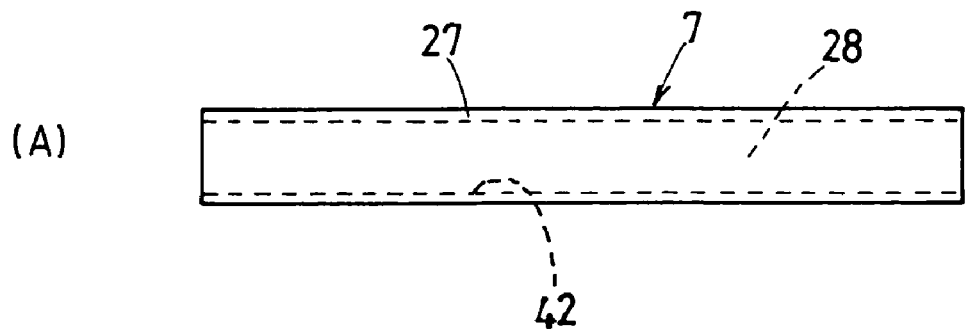
FIG. 5 shows a lubricant reservoir to fit into the carriage in the linear motion guide unit of FIG. 1. In the illustration labeled (A) the lubricant reservoir is shown in front elevation while the illustration labeled (B) is a view in left-sided elevation of the lubricant reservoir.

The lubricant reservoir 7, as shown in FIG. 5, is composed of the tubular cartridge 27 of cellular structure, which is circular in cross section to fit into the fore-and-aft hole 31 in the carriage 10, an occluding member 28 packed into an inside hole 42 of the cartridge 27, and lubricant filling cells or pores in both the cartridge 27 and the occluding member 28. With the version described now, the cartridge 27 is equivalent in substance and shape with the tubular member 30 and, therefore, is made of a sintered resinous compact of cellular structure. The cartridge 27 has the stiffness enough to preserve the contour of the lubricant reservoir 7 and the specific structure preferable to soaking up, occlude and further ooze lubricant. The occluding member 28 is made of heat-fused staple compact of acrylic long-fibers and so on, in which the staples are partially heat-joined together to keep the lubricant against lopsided in the occluding member 28 even when the slider 2 is driven with high-speed and high-cyclic acceleration. The occluding member 28 is moreover is made circular in cross section to fit snugly into the carriage 27 along the overall length thereof. The heat-fused staple compact may be any one of conventional compacts used in common for soft-tip pens to occlude ink, wicks to draw up fragrant liquid, applicators to transfer nutritious water to flowering plants, and so on. The occluding member 28 packed in the lubricant reservoir 7 is instrumental in keeping lubricant against leakage outside even if the lubricant reservoir 7 remains opened at the opposite ends thereof.

As an alternative of the lubricant reservoir 7, no occluding member 28 is used. Instead, semifluid grease for lubricant may directly charge the cartridge 27. With the alternative stated just above, the cartridge 27 may be made closed at the opposite ends thereof with plugs that are partially opened to allow the replenishment of lubricant.

In the first version of the lubricant reservoir 7 stated earlier, ample lubricant can stay in the occluding member 28 without leakage to ooze through the cartridge 27 into the first leading parts 9 of the leading member 39, which is kept in abutment against the cartridge 27.

Figure 6:
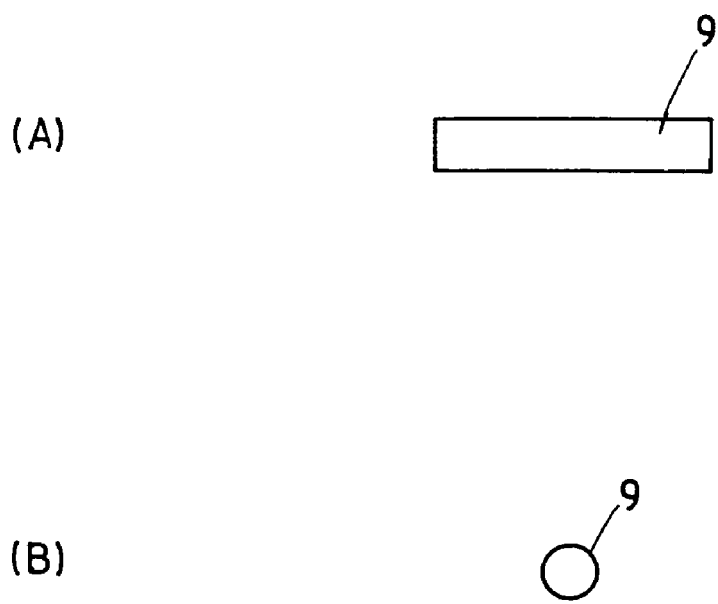
FIG. 6 shows a first leading member to fit into the carriage in the linear motion guide unit of FIG. 1. In the illustration labeled (A) the first leading member is shown in front elevation while the illustration labeled (B) is a view in left-sided elevation of the first leading member.
Figure 7:
FIG. 7 shows a second leading member to fit into the carriage in the linear motion guide unit of FIG. 1. In the illustration labeled (A) the second leading member is shown in front elevation while the illustration labeled (B) is a view in left-sided elevation of the second leading member.
Figure 7:

The first and second leading parts 9 and 19 of the leading member 39, as shown in FIGS. 6 and 7, are both made of staple compacts of synthetic resin long-fibers including acrylic long-fibers and so on. The first and second leading parts 9 and 19 are made circular in cross section to fit into their associated holes 32 and 33 respectively with leaving slight clearances around them. The staple compact of a bundle of long-fibers is equivalent to any one of conventional compacts used in common for soft-tip pens for water ink, oil paint, whiteboard, and so on. The second leading part 19 is especially made to have an outside diameter that wouldn't negatively affect on the mechanical strength of the tubular member 30 for the return passage 22, and preferably have an outside diameter less than a half the diameter of the tubular member 30. The first leading part 9 is preferably made intermediate in outside diameter between the lubricant reservoir 7 and the second leading part 17 to help transfer the lubricant from the lubricant reservoir 7 to the second leading part 17 without causing leakage or loss of the lubricant. Thus, it will be recommended that there is a geometrical relation of the outside diameter of the lubricant reservoir 7>the outside diameter of the first leading part 9>the outsider diameter of the second leading part 19.

The leading member 39 is expected to make sure of a gentle flow of lubricant from the lubricant reservoir 7 to the tubular member 30 with no leakage. As an alternative, the leading member 39 may be, as with the cartridge 27 or the tubular member 30, constructed with a sintered resinous compact of cellular structure, whether hollow or solid, which is made of a powder of ultrahigh molecular polyethylene. Moreover, the leading member 39 may be impregnated with lubricant prior to introducing it into the carriage 10.

Figure 8:
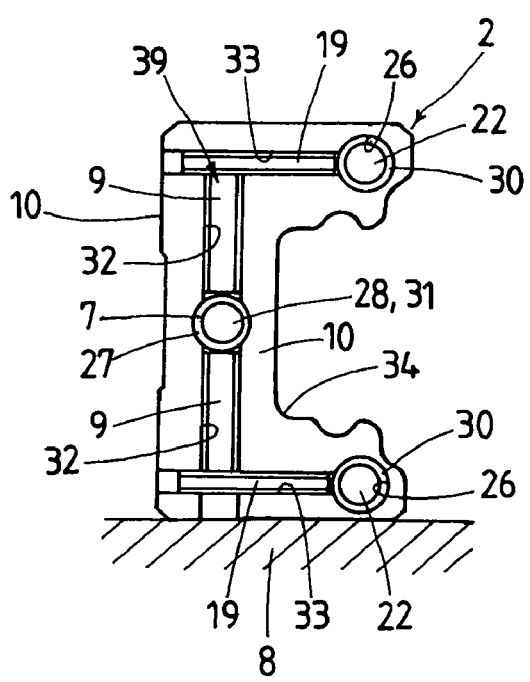
FIG. 8 is a view explanatory of a geometric mode of a slider when conducting the test to demonstrate how the lubricant flows from the lubricant reservoir to the tubular member.
Figure 9:
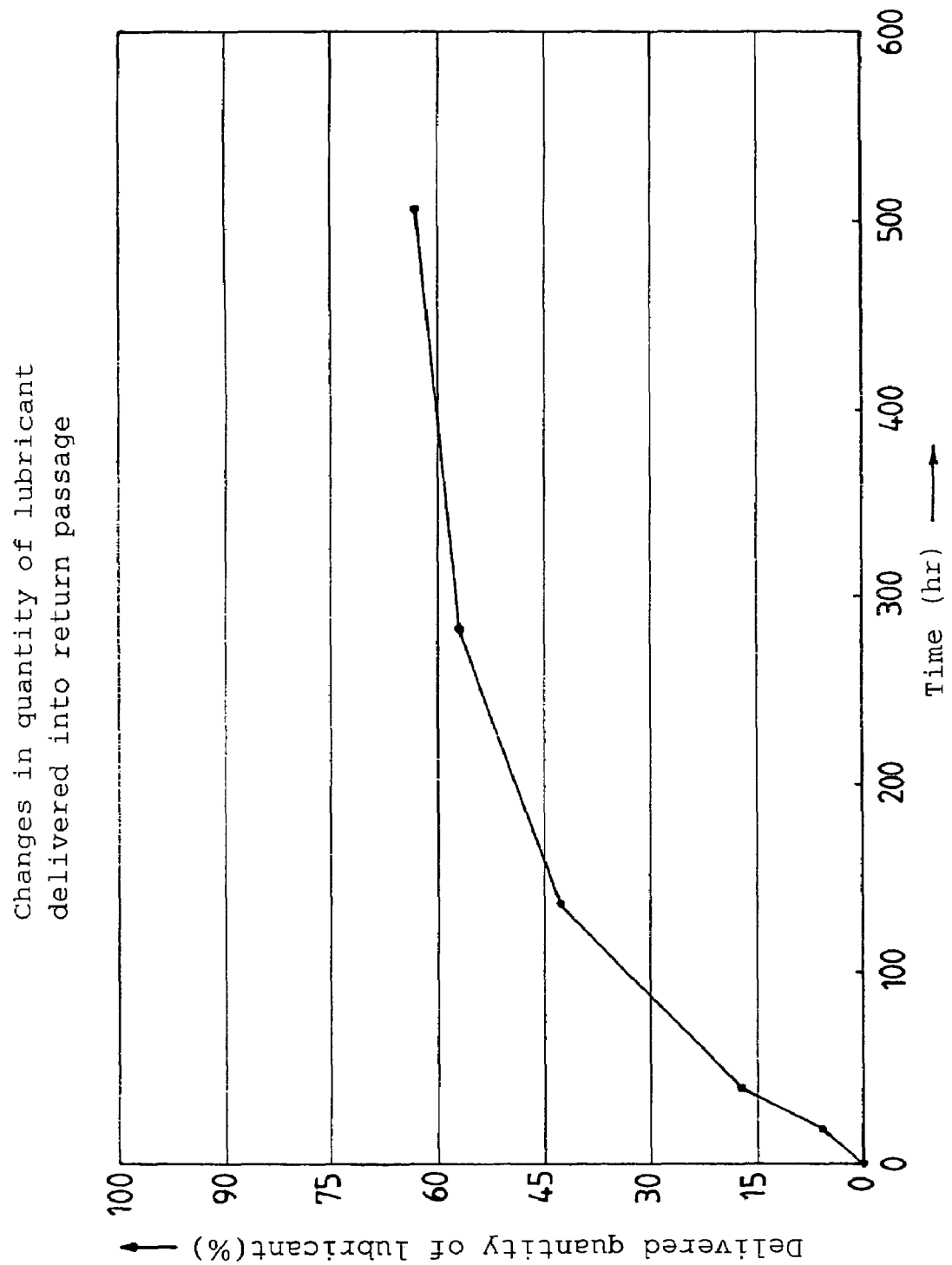
FIG. 9 is a graph showing quantity of lubricant delivered from the lubricant reservoir to the tubular member with the time that has elapsed in the test results demonstrated when the slider is placed in the geometric mode shown in FIG. 8.

In FIG. 8, there is shown a schematic view explanatory of a geometric mode of the carriage 10 of the slider 2 when conducting the test to demonstrate how the lubricant flows from the lubricant reservoir 7 to the tubular member 30 for the return passage 22. In addition, FIG. 9 is a graph showing quantity of lubricant delivered from the lubricant reservoir 7 to the tubular member 30 for the return passage 22 with the time that has elapsed in the test results demonstrated when the slider 2 is placed in the geometric mode shown in FIG. 8. Changes in quantity of lubricant delivered into the return passage 22 in FIG. 9 represents the test result as to how the lubricant is transferred from the lubricant reservoir 7 to the tubular member 30 for the return passage 22 when the slider is laid on any one side thereof as shown in FIG. 8. The test result was obtained by the tubular member 30 and the leading member 39 which are both initially impregnated with no lubricant. Thus, the delivered quantity of lubricant on an ordinate in FIG. 8 represents how much proportion (%) of the cells or pores in the tubular member 30 and the leading member 39 was being impregnated or filled with lubricant as the time elapsed. Many test results given on various different materials demonstrated the lubricant reservoir 7, leading member 39 and tubular member 30 made of the materials recited earlier were most suitable for transferring gently lubricant with no seepage or leakage.

With the linear motion guide unit constructed as stated earlier, the lubricant reservoir 7 is made of the sintered resinous compact of cellular structure while the occluding member 28 fit into the lubricant reservoir 7 is made of staples fused together in part with heat. The leading member 39 made up of the first and second leading parts 9 and 12 is provided by the staple compact of synthetic resin long-fibers. Other experimental results confirmed that the leading member 39 made of the sintered resin of cellular structure also proved successful result like the test results stated earlier in gentle transfer of lubricant with no seepage. With the demonstration carried out with the slider 2 that was laid on its side as shown in FIG. 8, the lubricant in the mid-height lubricant reservoir 7 would be directed towards not only the lower tubular member 30, but also in part the upper tubular member 30. Therefore, the quantity of lubricant delivered into the return passage in FIG. 9 represents an average between the quantities of lubricant reaching the upper and lower tubular members 30 respectively. It will be however obvious that the quantity delivered to each tubular member 30 is actually more at the lower one than at the upper one. Other long-lasting test results demonstrated that the linear motion guide unit with the lubrication system constructed as recited earlier was made it possible to harbor ample quantity of lubricant enough to work over an extended range more than three times in running distance and operating time as compared with the conventional one. For some operating situations where the lubricant would be consumed away steeply, an alternative leading member 39 may be recommended which is composed of a hollow tube of sintered resin having celluler structure, and a non-woven fabric of long-staple cotton 100% inserted in the hollow tube of sintered resin. Moreover, the lubricant reservoir 7, although described earlier as the construction that is replaceable with new one in the linear motion guide unit, may be made in a modified construction that the lubricant can be replenished through a grease nipple 25 or other couplings. With this modification, the lubricant supplied through the grease nipple 25 is applied into the cartridge 27 of the lubricant reservoir 7 while loaded in the conventional lubricating path.

What is claimed is:

1. A linear motion guide unit comprising:
  a guide rail having a first lengthwise raceway groove thereon, and a slider having a carriage made therein with a second raceway groove in opposition to the first raceway groove, the slider being allowed to move lengthwise of the guide rail by virtue of a plurality of rolling elements,
  wherein the carriage includes a tubular member having a return passage which allows the rolling element to roll through the return passage,
  a cartridge having a cellular structure which forms a lubricant reservoir that maintains a lubricant therein which oozes through the cartridge into a leading member,
  wherein the tubular member has a cellular structure adapted to be impregnated with the lubricant which is sequentially applied to the tubular member to lubricate the rolling members,
  wherein the leading member serves to move the lubricant directly from the lubricant reservoir to the tubular member,
  wherein the cartridge is made of a sintered resin shaped in a tubular construction,
  wherein the leading member is made of a staple compact of synthetic resin long-fibers and arranged to abut an outside surface of the cartridge and an outside surface of the tubular member so as to be spaced apart from the rolling elements, and
  wherein the cartridge has holes to respectively receive the tubular member, lubricant reservoir and leading member.

2. A linear motion guide unit constructed as defined in claim 1, wherein the cartridge of the lubricant reservoirs holds therein an occluding member made of heat-fused staple compact in which stapes are partially heat-joined together to form the cellular structure to keep the lubricant against lopsided inside the cartridge.

3. A linear motion guide unit constructed as defined in claim 1, wherein the leading member is made up of a first leading part and a second leading part, the hole to receive the leading member is made up of a first hole section to receive therein the first leading part and a second hole intersecting with the first hole section to receive therein the second leading part, and the first and second leading parts come into engagement with one another.

4. A linear motion guide unit constructed as defined in claim 3, wherein the first leading part comes into abutment at any one end thereof against the cartridge forming the lubricant reservoir while at another end thereof abuts against the second leading part, and wherein the first leading part extends between the lubricant reservoir and the second leading part.

5. A linear motion guide unit constructed as defined in claim 3, wherein the first leading part fits into the first hole section while the second leading part fits into the second hole section, and wherein first and second hole sections are both closed with sealing plugs at their ends and extends into the atmosphere.

6. A linear motion guide unit constructed as defined in claim 3, wherein the first hole section is made in the carriage to extend in widthwise direction of the carriage while the second hole section is made to extend from a top surface of the carriage to the hole into which the tubular member fits to provide the return passage.

7. A linear motion guide unit comprising:
  a guide rail having a first lengthwise raceway groove thereon, and a slider having a carriage made therein with a second raceway groove in opposition to the first raceway groove, the slider being allowed to move lengthwise of the guide rail by virtue of a plurality of rolling elements, wherein the carriage includes a tubular member having a return passage which allows the rolling element to roll through the return passage, a cartridge having a cellular structure which forms a lubricant reservoir that maintains a lubricant therein which oozes through the cartridge into a leading member, wherein the tubular member has a cellular structure adapted to be impregnated with the lubricant which is sequentially applied to the tubular member to lubricate the rolling members, and wherein the leading member serves to move the lubricant directly from the lubricant reservoir to the tubular member, wherein the cartridge of the lubricant reservoir is made of a sintered resin shaped in a tubular construction, wherein the leading member is constituted with a sintered resin of cellular structure and abuts against the outside surface of the cartridge and the outside surface of the tubular member so as to be spaced apart from the rolling elements, and wherein the carriage has holes to respectively receive the tubular member, lubricant reservoir and leading member.

* * * * *